US008567798B2

(12) United States Patent
Rossini et al.

(10) Patent No.: US 8,567,798 B2
(45) Date of Patent: Oct. 29, 2013

(54) MOBILE CART BASE WITH TRACTION WHEEL

(75) Inventors: Alfred P. Rossini, Southborough, MA (US); Leonard Halio, Westford, MA (US); Jeffrey M. Silverman, Stoughton, MA (US); David Maloney, Medway, MA (US); David Leiter, East Taunton, MA (US); Thomas Bagley, Upton, MA (US)

(73) Assignee: Jaco, Inc., Franklin, MA (US)

( * ) Notice: Subject to any disclaimer, the term of this patent is extended or adjusted under 35 U.S.C. 154(b) by 228 days.

(21) Appl. No.: 13/035,481

(22) Filed: Feb. 25, 2011

(65) Prior Publication Data
US 2011/0140381 A1    Jun. 16, 2011

Related U.S. Application Data

(63) Continuation-in-part of application No. 12/418,338, filed on Apr. 3, 2009, now abandoned.

(60) Provisional application No. 61/308,965, filed on Feb. 28, 2010, provisional application No. 61/074,170, filed on Jun. 20, 2008.

(51) Int. Cl.
*B62B 3/00* (2006.01)
(52) U.S. Cl.
USPC ........................ 280/47.35; 280/43; 280/79.11
(58) Field of Classification Search
USPC .......... 280/47.34, DIG. 4, 638, 35, 43, 47.35, 280/47.41, 79.11; 312/319.1
See application file for complete search history.

(56) References Cited

U.S. PATENT DOCUMENTS

| 2,563,919 | A | * | 8/1951  | Christensen ............... 280/43.18 |
| 2,935,331 | A | * | 5/1960  | Ledgerwood ............... 280/79.3  |
| 3,391,256 | A |   | 7/1968  | Nawman                              |
| 3,715,148 | A |   | 2/1973  | Beals                               |
| 3,744,282 | A |   | 7/1973  | Hemphill                            |
| 3,910,659 | A |   | 10/1975 | Peterson                            |
| 4,005,279 | A |   | 1/1977  | Richter                             |
| 4,453,692 | A |   | 6/1984  | LeDoux et al.                       |
| 4,471,409 | A |   | 9/1984  | Dittrich                            |
| 4,696,449 | A |   | 9/1987  | Woo et al.                          |
| 4,750,204 | A |   | 6/1988  | Bartley et al.                      |
| 4,937,860 | A |   | 6/1990  | Smith                               |
| 4,946,120 | A |   | 8/1990  | Hatcher                             |
| 5,052,651 | A |   | 10/1991 | Guddee                              |
| 5,085,395 | A |   | 2/1992  | Frater et al.                       |
| 5,595,074 | A |   | 1/1997  | Munro                               |
| 5,645,261 | A |   | 7/1997  | Glynn                               |
| 5,673,628 | A |   | 10/1997 | Boos                                |

(Continued)

*Primary Examiner* — Hau Phan
*Assistant Examiner* — Bryan Evans
(74) *Attorney, Agent, or Firm* — Mirick, O'Connell, DeMallie & Lougee, LLP

(57) ABSTRACT

A multi-wheeled base for a mobile cart includes one or more swiveling, optionally locking, caster wheels and one or more non-swiveling traction wheels to improve the maneuverability of the cart by making it easier to steer and stop. The traction wheels may be manually-engaged traction wheels, which may be operated by a cam and lever. The traction wheels may also be automatically-engaged traction wheels operated by a motor and a threaded shaft, and activated by a motion-sensitive sensor or by an on/off electrical switch or button. The traction wheels are preferably in contact with the floor when the mobile cart is moving, and raised above the surface of the floor when the cart is stationary.

14 Claims, 14 Drawing Sheets

(56) References Cited

U.S. PATENT DOCUMENTS

| | | | |
|---|---|---|---|
| 5,709,110 A | 1/1998 | Greenfield et al. | |
| 5,769,369 A | 6/1998 | Meinel | |
| 5,794,463 A | 8/1998 | McDaid | |
| 5,836,183 A | 11/1998 | Derman | |
| 5,859,762 A | 1/1999 | Clark et al. | |
| 5,941,180 A | 8/1999 | Becker | |
| 6,021,720 A | 2/2000 | Boos et al. | |
| 6,216,499 B1 | 4/2001 | Ronberg et al. | |
| 6,237,375 B1 | 5/2001 | Wymer | |
| 6,256,812 B1 * | 7/2001 | Bartow et al. | 5/86.1 |
| 6,443,417 B2 | 9/2002 | Galant | |
| 6,491,268 B1 | 12/2002 | Channer et al. | |
| 6,491,276 B1 | 12/2002 | Belliveau | |
| 6,585,212 B2 | 7/2003 | Carnevali | |
| 6,711,921 B1 | 3/2004 | Yang | |
| 6,763,690 B2 | 7/2004 | Galant | |
| 7,007,912 B1 | 3/2006 | Guiliani et al. | |
| 7,315,443 B2 | 1/2008 | Allen | |
| 2004/0007651 A1 | 1/2004 | Williams et al. | |
| 2004/0177658 A1 | 9/2004 | Mitchell | |
| 2009/0315287 A1 | 12/2009 | Rossini | |

* cited by examiner

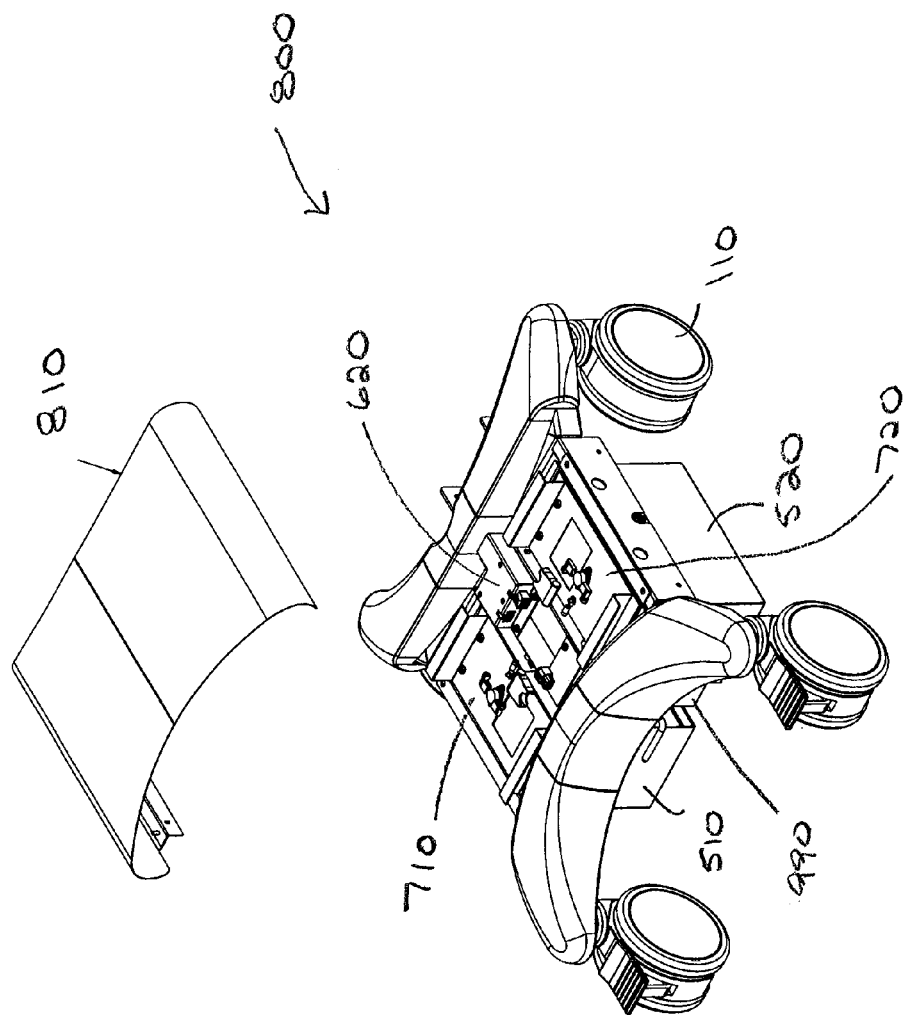

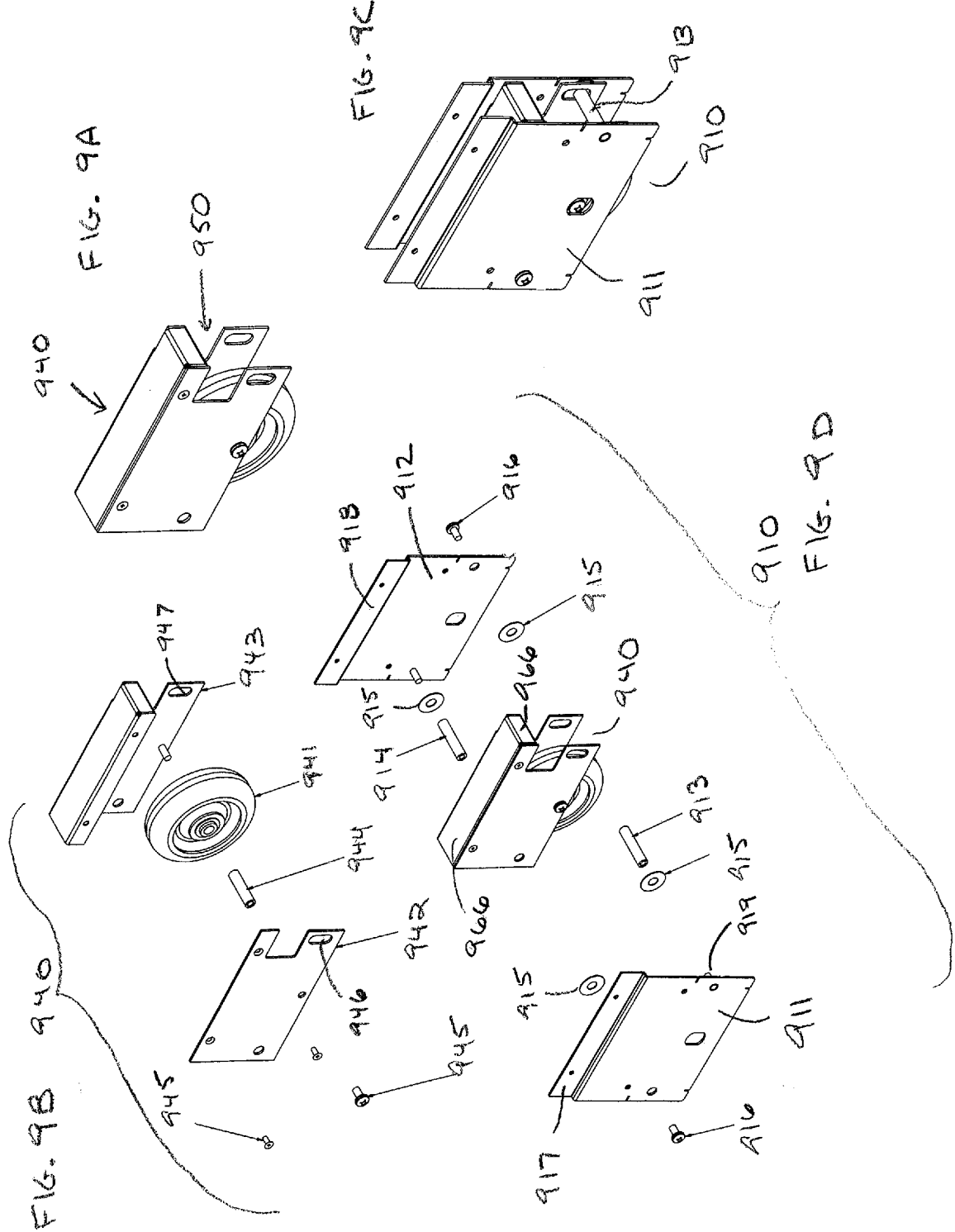

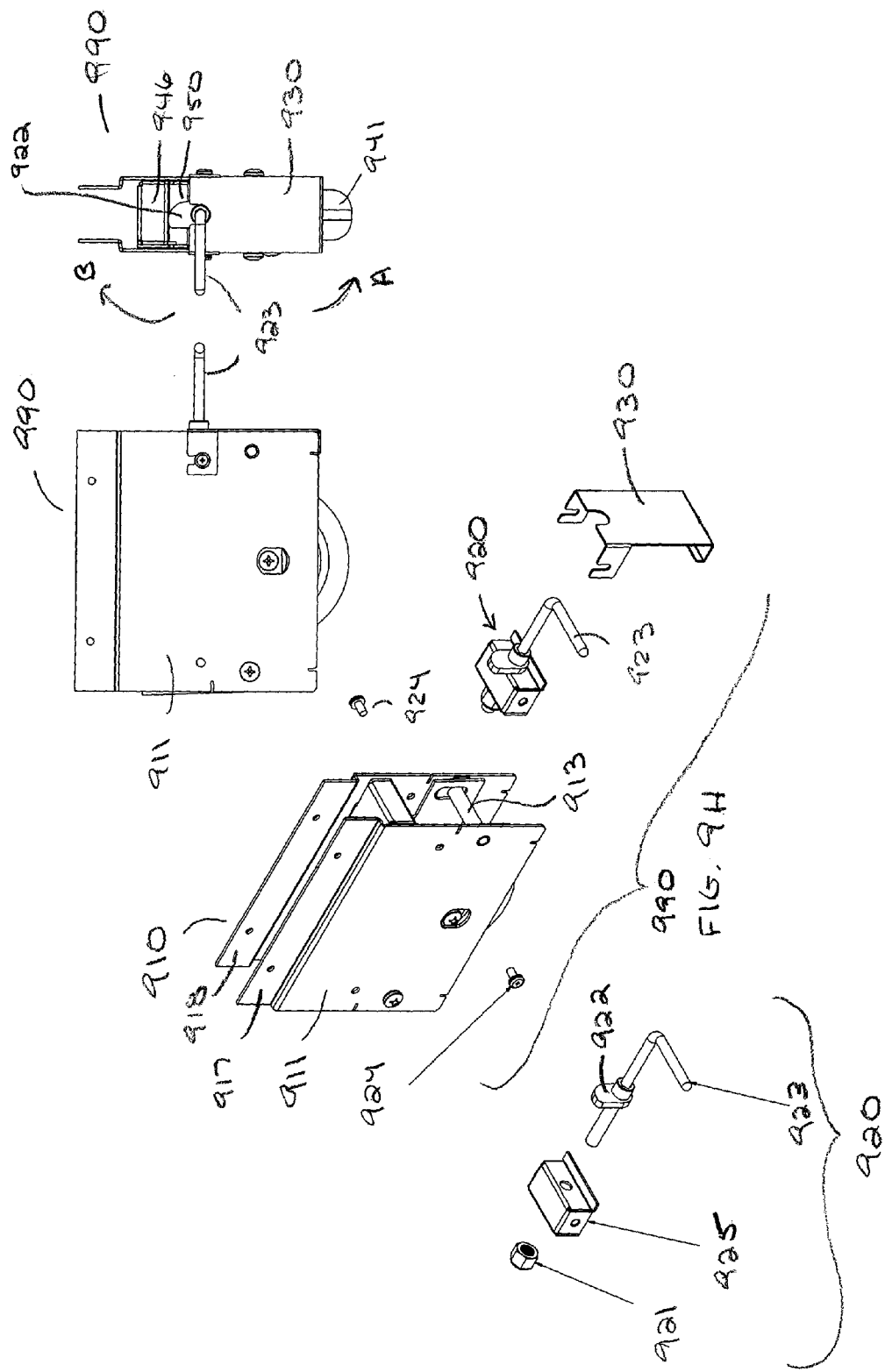

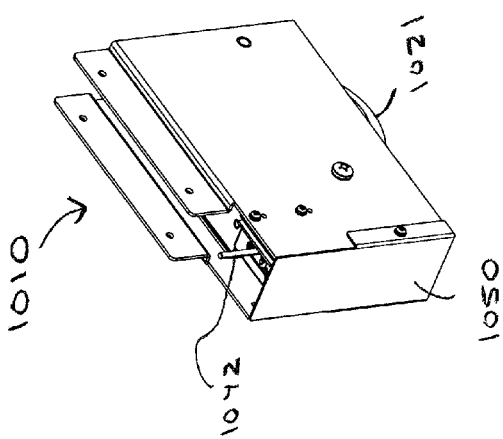
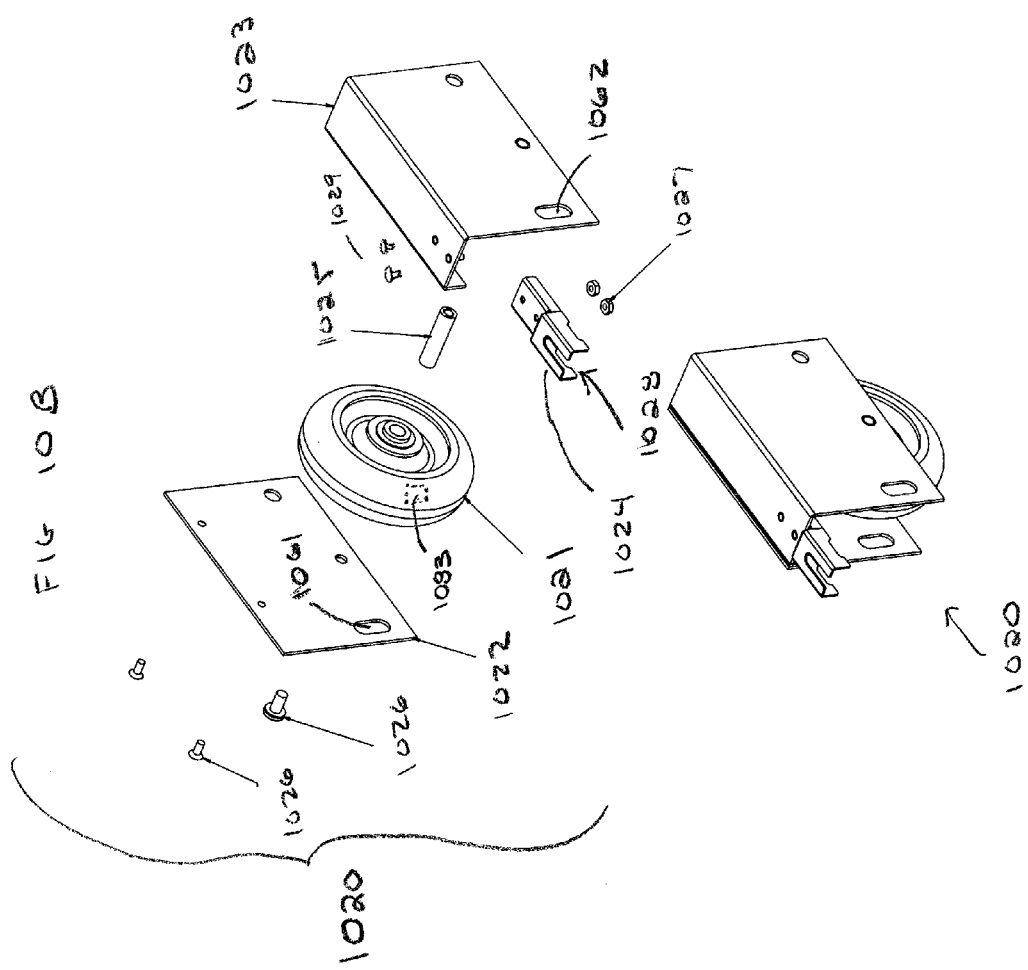

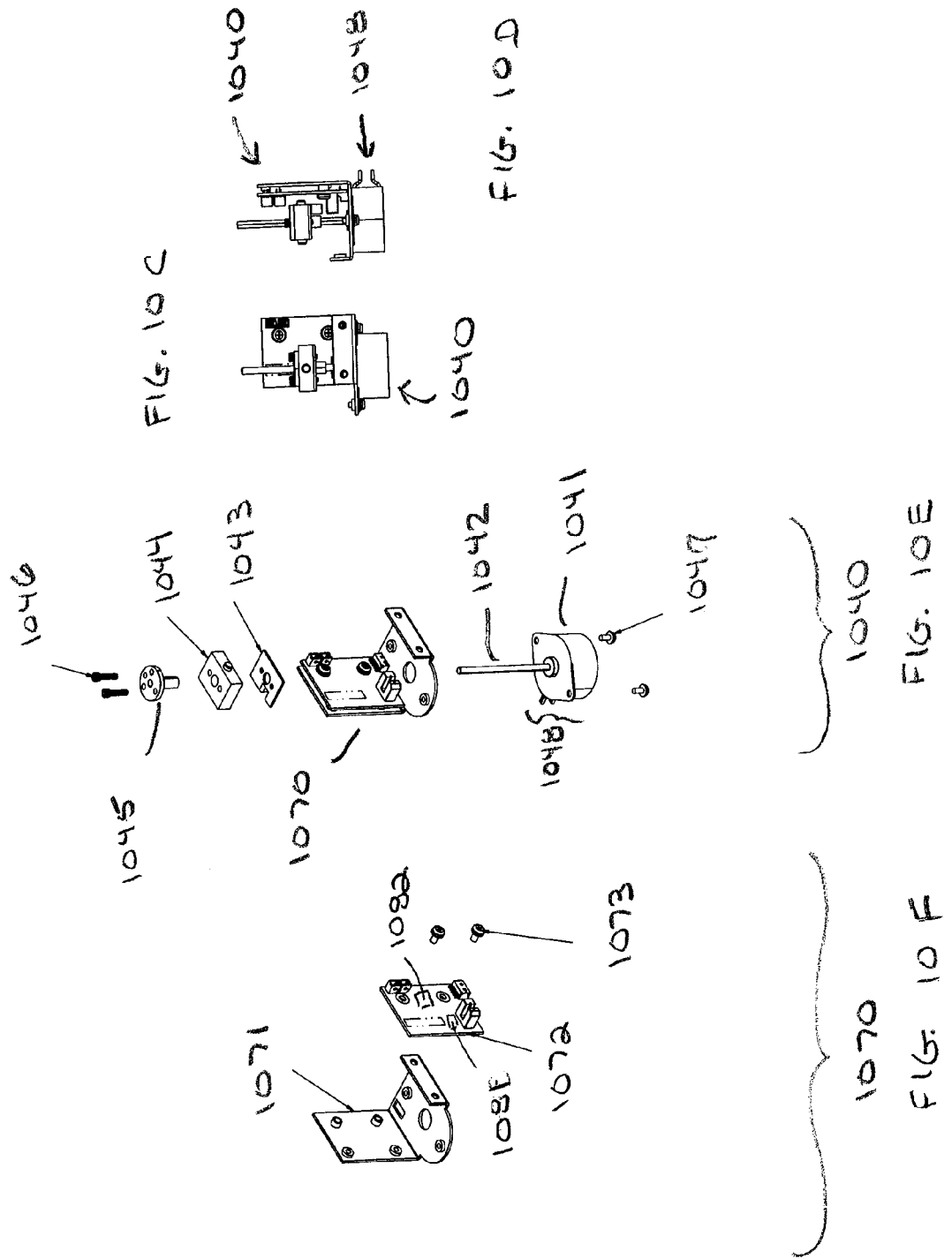

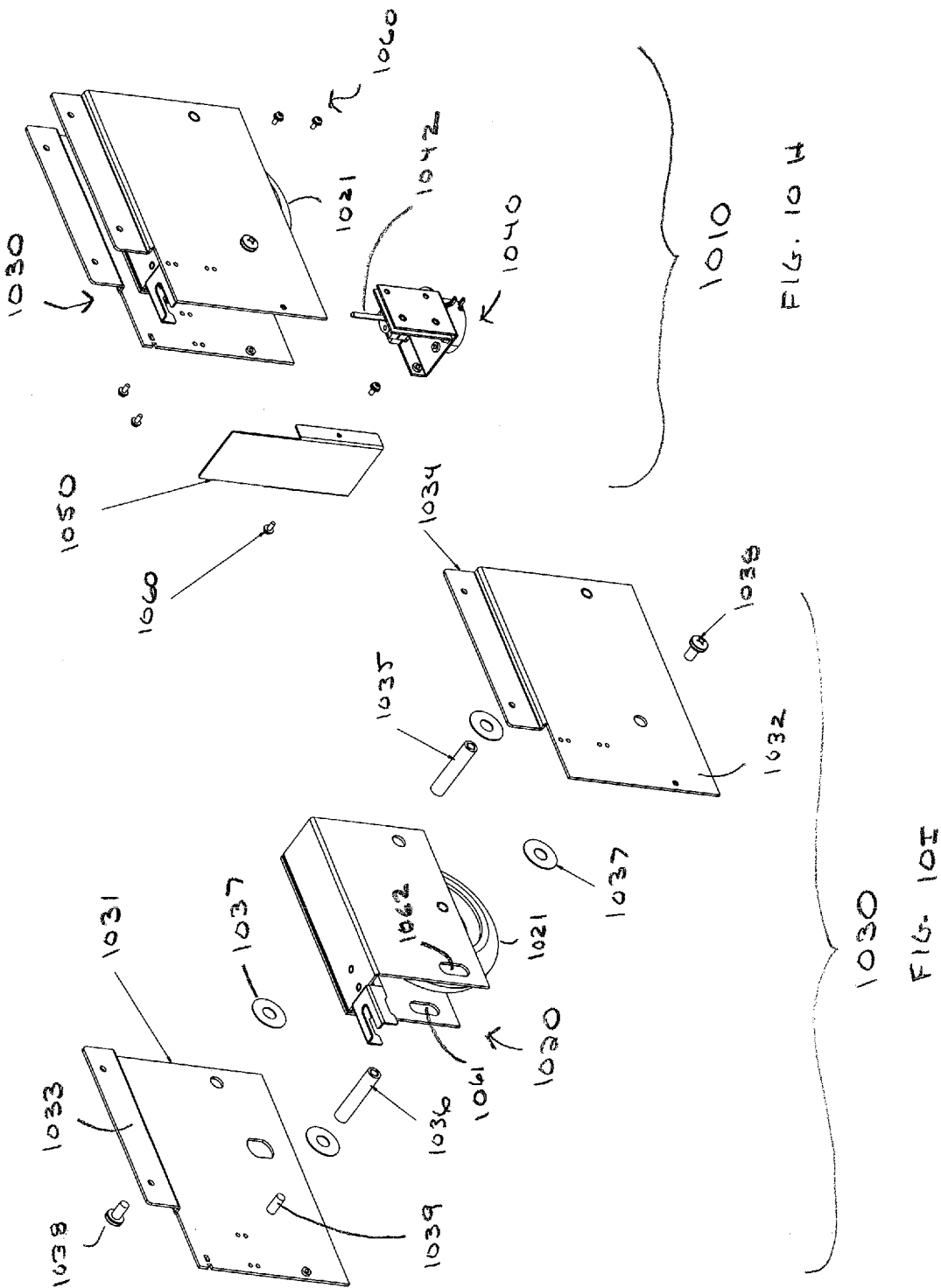

MOBILE CART BASE WITH TRACTION WHEEL

CROSS-REFERENCE TO RELATED APPLICATION

This application claims priority to U.S. Provisional Patent Application Ser. No. 61/308,965, entitled "MOBILE CART BASE WITH TRACTION WHEEL," filed on Feb. 28, 2010, and is a continuation-in-part and claims priority to co-pending U.S. patent application Ser. No. 12/418,338, entitled "MOBILE CART," filed on Apr. 3, 2009, which itself claims priority to U.S. Provisional Patent Application Ser. No. 61/074,170, entitled "BEDSIDE MEDICATION DELIVERY CART," filed on Jun. 20, 2008. The entire contents of all three priority applications are expressly incorporated by reference herein.

FIELD OF THE INVENTION

The invention relates generally to the field of carts, and particularly to mobile carts with multi-wheeled bases.

BACKGROUND OF THE INVENTION

Mobile carts are employed in many industries, and may be used to carry a computer, monitor, display, or other electronic equipment; to provide a work surface, such as for a computer keyboard and mouse; and/or to provide portable storage, such as a tray or compartment. The overall weight of some mobile carts, particularly those equipped with electronic equipment and power supplies, may be an ergonomic issue. With an average weight exceeding 100 pounds, pushing a mobile cart can be tiring and cumbersome, especially for smaller users.

In the past, mobile carts have been equipped with four swivel casters or wheels, which permit the user to maneuver the cart around corners, or push it out of the way if necessary, but makes the cart difficult to steer. In particular, the momentum of the cart may be a problem if the cart is moved quickly, as the cart may become difficult to stop or turn. In addition, the carts are difficult to push in a straight line, as the four swivel casters may cause the cart to move slightly from side to side as it pushed, especially if the floors are uneven.

The maneuverability of a mobile cart can be improved by making two of the four casters ridged or non-swiveling. In this configuration, the mobile cart operates much like a shopping cart, and the user steers the cart by controlling the front end. This is not ideal, however, because it is still difficult to turn tight corners, and nearly impossible to pivot in place.

There is a need in the art, then, for a mobile cart that is easy to maneuver; a cart that can turn effortlessly and quickly, without a concern that the momentum of the cart will lead the cart astray. In addition, there is a need for a mobile cart that will move in a straight line when pushed, and will self-adjust so that the wheels stay in contact with the floor, either automatically, in response to the movement of the cart, or manually.

SUMMARY OF THE INVENTION

The invention provides a multi-wheeled base for a mobile cart. The base may include one or more swiveling, optionally locking, caster wheels and one or more non-swiveling traction wheels to improve the maneuverability of the cart by making it easier to steer and stop. The traction wheels may be manually-engaged traction wheels, which in one non-limiting example may be operated by a cam and lever. The traction wheels may also be automatically-engaged traction wheels operated by a motor and a threaded shaft, activated by a motion-sensitive sensor or by an on/off electrical switch or button.

The multi-wheeled base may comprise a base frame that is generally rectangular, and may include four protruding legs, one leg extending from and proximate each corner of the base frame. One swiveling caster wheel may be mounted to each of the protruding legs. If the base frame does not include the protruding legs, the swiveling caster wheels may be mounted to the base frame at the corners of the base frame.

The base frame is preferably configured to accommodate one or more optional battery cell housings and battery cells, in which case an electrical interconnect assembly is used to connect the battery cells and provide electrical connections for the mobile cart, including the electrical connections needed to power the automatically-engaged traction wheel.

One non-limiting embodiment of the manually-engaged traction wheel includes a traction wheel housing and a cam and lever wheel-positioning assembly. The traction wheel housing includes a wheel assembly sandwiched between two assembly plates, such that the wheel assembly may move up and down a short distance relative to the assembly plates. The up and down movement of the wheel assembly is controlled by the cam and lever assembly, and is guided and limited by elongated slots defined in the assembly plates. When the lever is in a first position, the cam and lever assembly is engaged, the wheel assembly is lowered, and the wheel of the wheel assembly touches the floor or ground. When the lever is moved up or down ninety-degrees from the first position, the cam and lever assembly is disengaged, the wheel assembly is raised, and the wheel is lifted off the floor or ground.

In a non-limiting embodiment, the automatically-engaged traction wheel includes a traction wheel housing and a motor and threaded shaft wheel-positioning assembly. The traction wheel housing includes a wheel assembly sandwiched between two assembly plates, such that the wheel assembly may move up and down a short distance relative to the assembly plates. The up and down movement of the wheel assembly is controlled by the motor and shaft assembly, and is guided and limited by elongated slots defined in the assembly plates. A Hall effect sensor is used to detect an "on/off" signal from a magnet embedded in the rotating wheel. As long as the Hall effect sensor detects the "on/off" signal from the magnet, the motor and the threaded shaft turn such that the wheel assembly is lowered, and the wheel touches the floor or the ground. When the Hall effect sensor stops receiving the "on/off" signal from the magnet, because the wheel is no longer rotating, the motor and the threaded shaft turn such that the wheel assembly is lifted, and the wheel is lifted off the floor or ground.

In an embodiment, mobile cart base comprises a base frame having a generally rectangular shape and a front frame member, a rear frame member, two opposing side members, and a center frame member coupled to the front frame member and the rear frame member, where the center frame member is generally parallel to the opposing side members and generally perpendicular to the front frame member and the rear frame member; four swiveling wheels mounted to the base frame proximate each of the four corners of the base frame; and a non-swiveling traction wheel mounted to the center frame member, where the traction wheel comprises a cam and lever assembly that is adapted to raise and lower the traction wheel relative to the base frame.

In another embodiment, a mobile cart base comprises a base frame having a generally rectangular shape and a front frame member, a rear frame member, two opposing side members, and a center frame member coupled to the front frame member and the rear frame member, where the center frame member is generally parallel to the opposing side members and generally perpendicular to the front frame member and the rear frame member; four swiveling wheels mounted to the base frame proximate each of the four corners of the base frame; and a non-swiveling traction wheel mounted to the center frame member, where the traction wheel comprises a motor and threaded spindle assembly that is adapted to raise and lower the traction wheel relative to the base frame.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 8A is a perspective view of the rolling base section of FIG. 7, showing the addition of a top cover member;

FIG. 9A is perspective view of a wheel assembly for a manually-engaged traction wheel;

FIG. 9B is an exploded view of the components of the wheel assembly of FIG. 9A;

FIG. 9C is a perspective view of a traction wheel housing for a manually-engaged traction wheel;

FIG. 9D is an exploded view of the components of the traction wheel housing of FIG. 9C;

FIG. 9E is a side view of a manually-engaged traction wheel;

FIG. 9F is a front view of the manually-engaged traction wheel of FIG. 9E;

FIG. 9G is an exploded view of the components of a cam and lever assembly of the manually-engaged traction wheel of FIG. 9E;

FIG. 9H is an exploded view of the components of the manually-engaged traction wheel of FIG. 9E;

FIG. 10A is a perspective view of a wheel assembly for an automatically-engaged traction wheel;

FIG. 10B is an exploded view of the components of the wheel assembly of FIG. 10A;

FIG. 10C is a front view of a motor and shaft assembly for an automatically-engaged traction wheel;

FIG. 10D is a side view of the motor and shaft assembly of FIG. 10C;

FIG. 10E is an exploded view of the components of the motor and shaft assembly of FIG. 10C;

FIG. 10F is an exploded view of the motor electrical assembly of the motor and shaft assembly of FIG. 10E;

FIG. 10G is a perspective view of an automatically-engaged traction wheel;

FIG. 10H is an exploded view of the components of the automatically-engaged traction wheel of FIG. 10G; and FIG. 10I is an exploded view of a traction wheel housing for an automatically-engaged traction wheel.

DETAILED DESCRIPTION OF THE INVENTION

I. Mobile Cart Base

With reference to FIGS. 1 through 8, in a preferred embodiment, mobile cart base 800 comprises a rolling base section 100 that includes a generally rectangular base frame 105 and four omni-directional, optionally locking swiveling casters or wheels 110. In alternate embodiments, mobile cart base 800 may include a generally elliptical base frame, or a base frame comprising three, four or more sides, and may have two, three or more swiveling wheels.

Figure 1:
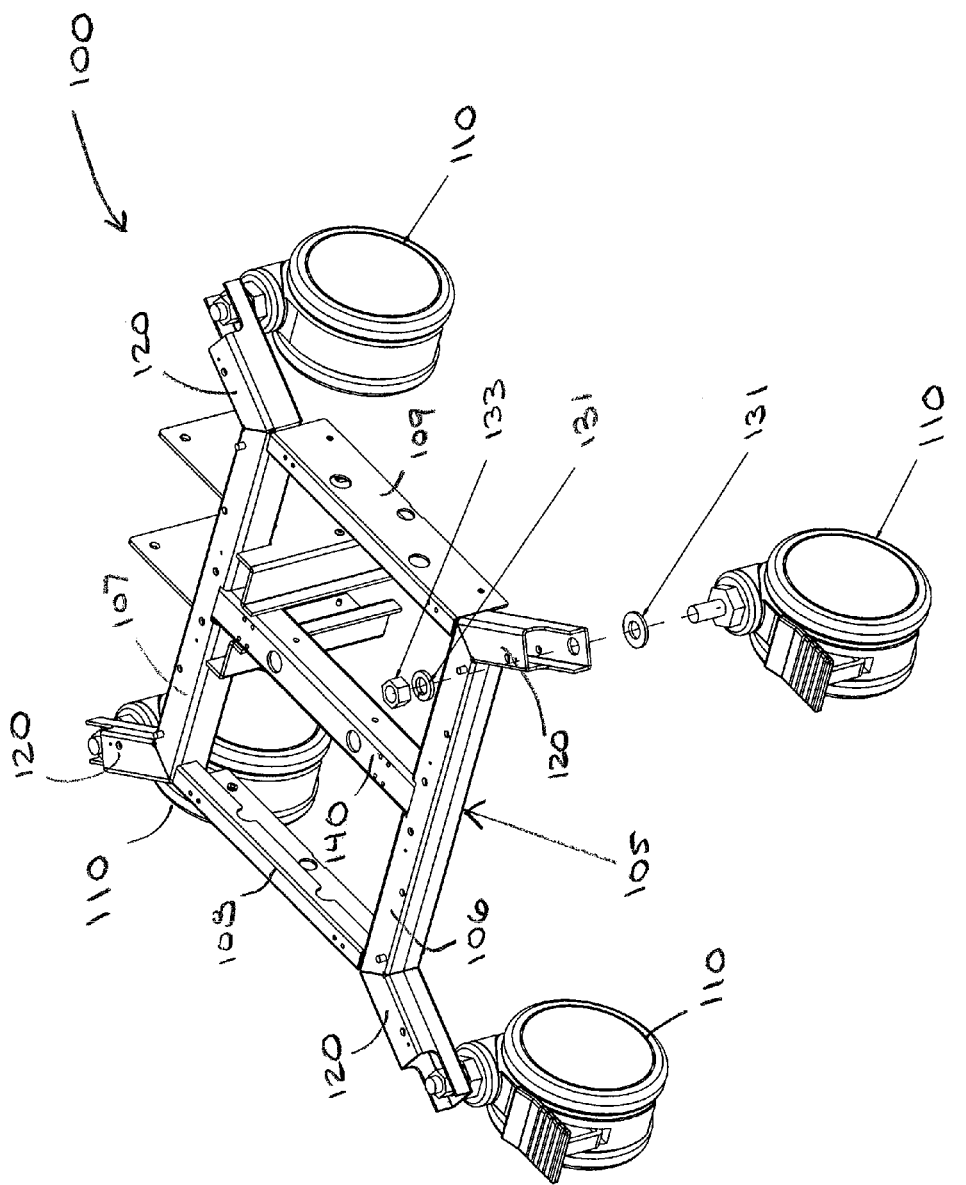
FIG. 1 is a perspective view of a preferred embodiment of a rolling base section of a mobile cart base.

As shown in FIG. 1, base frame 105 comprises a front frame member 106, a rear frame member 107, two opposing side frame members, left side member 108 and right side member 109, and center frame member 140. In a preferred embodiment, base frame 105 includes four protruding legs 120, one protruding leg located proximate each corner of the base frame 105. Base frame 105 is preferably constructed of metal, although other materials, suitable for accommodating the weight of the mobile cart, are within the scope of the invention. One swiveling caster or wheel 110 is coupled to each protruding leg 120 with washers 131 and nut 133, although other types of connectors or fasteners known in the art may be used. In alternate embodiments, protruding legs 120 are optional, and one swiveling caster or wheel 110 may be coupled directly to each of the corners of base frame 105, or proximate the corners of base frame 105.

Figure 2:
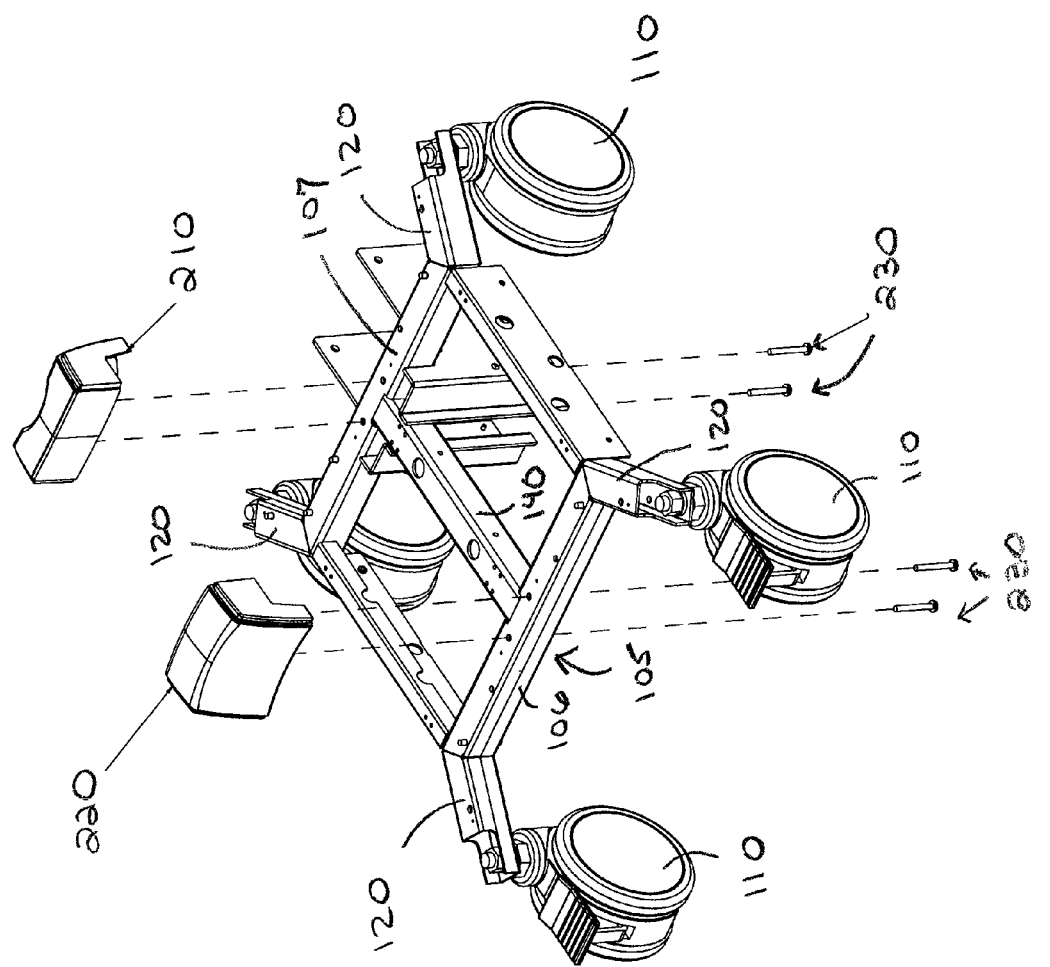
FIG. 2 is a perspective view of the rolling base section of FIG. 1, showing the addition of front and rear cover members.
Figure 3:
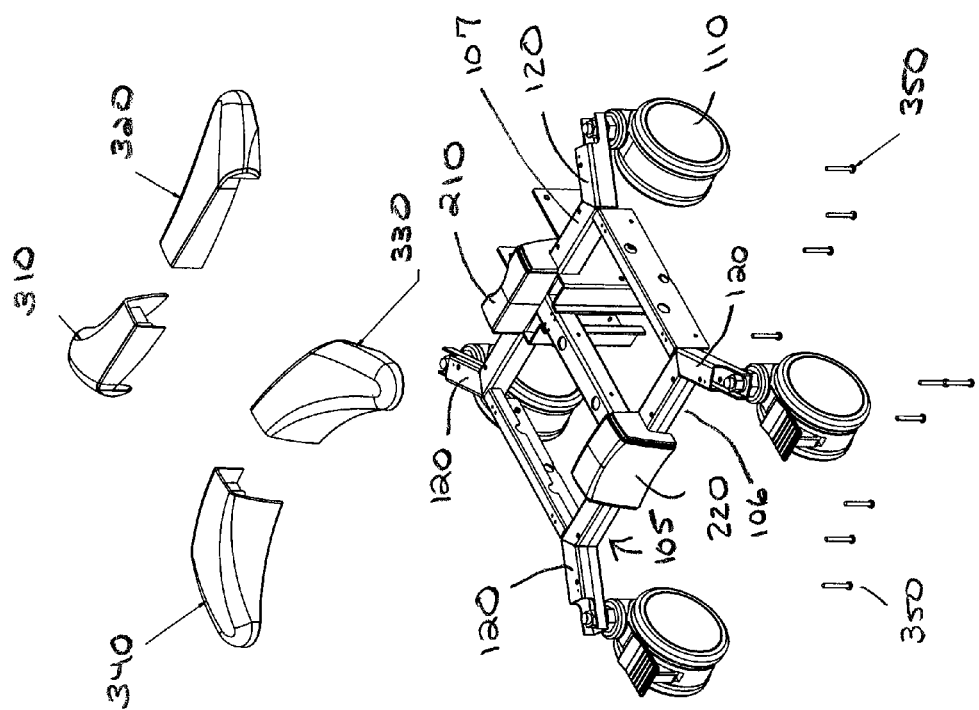
FIG. 3 is a perspective view of the rolling base section of FIG. 2, showing the addition of corner cover members.

As shown in FIGS. 2 and 3, front cover member 220 is mounted to base frame 105 proximate the center of front frame member 106, and rear cover member 210 is mounted to base frame 105 proximate the center of rear frame member 107 with screws 230, or other types of connectors or fasteners. In a preferred embodiment, front cover member 220 and rear cover member 210 are made of plastic.

Figure 4:
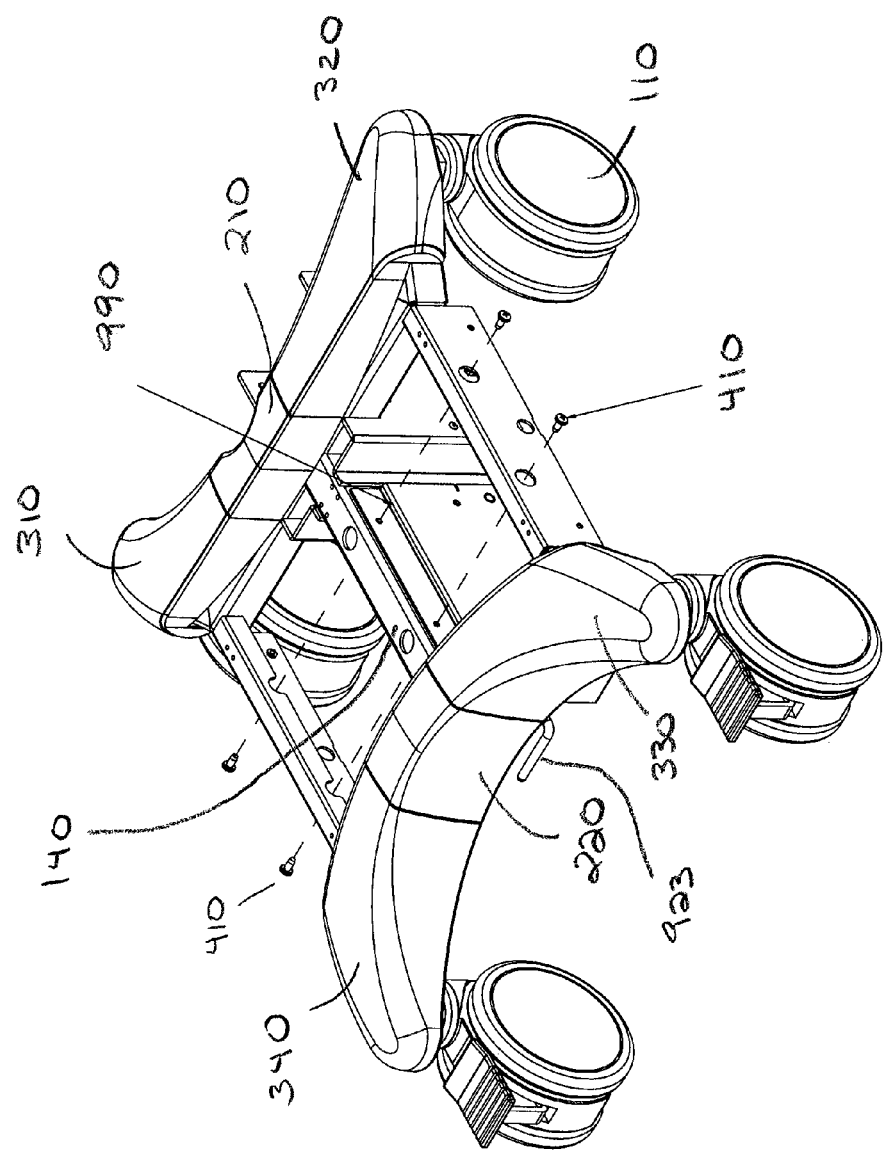
FIG. 4 is a perspective view of the rolling base section of FIG. 3, showing the addition of a manually-engaged traction wheel.

As shown in FIGS. 3 and 4, each of the corner cover members 310, 320, 330 and 340 is mounted to base frame 105 proximate each of the corners of base frame 105 with screws 350 or other types of known fasteners or connectors, so as to cover the tops of the protruding legs 120. Once mounted to base frame 105, and as shown in FIG. 4, corner cover members 330 and 340 and front cover member 220 are adapted and configured to cover substantially the entire top of front frame member 106. Similarly, corner cover members 310 and 320 and rear cover member 210 are adapted and configured to cover substantially the entire top of rear frame member 107 once mounted to base frame 105. Corner cover members 310, 320, 330 and 240 are preferably made of plastic.

With reference to FIG. 4, and as described in detail below, manually-engaged traction wheel 990 is mounted to center frame member 140 with screws 410 or other known forms of connectors or fasteners.

Figure 5:
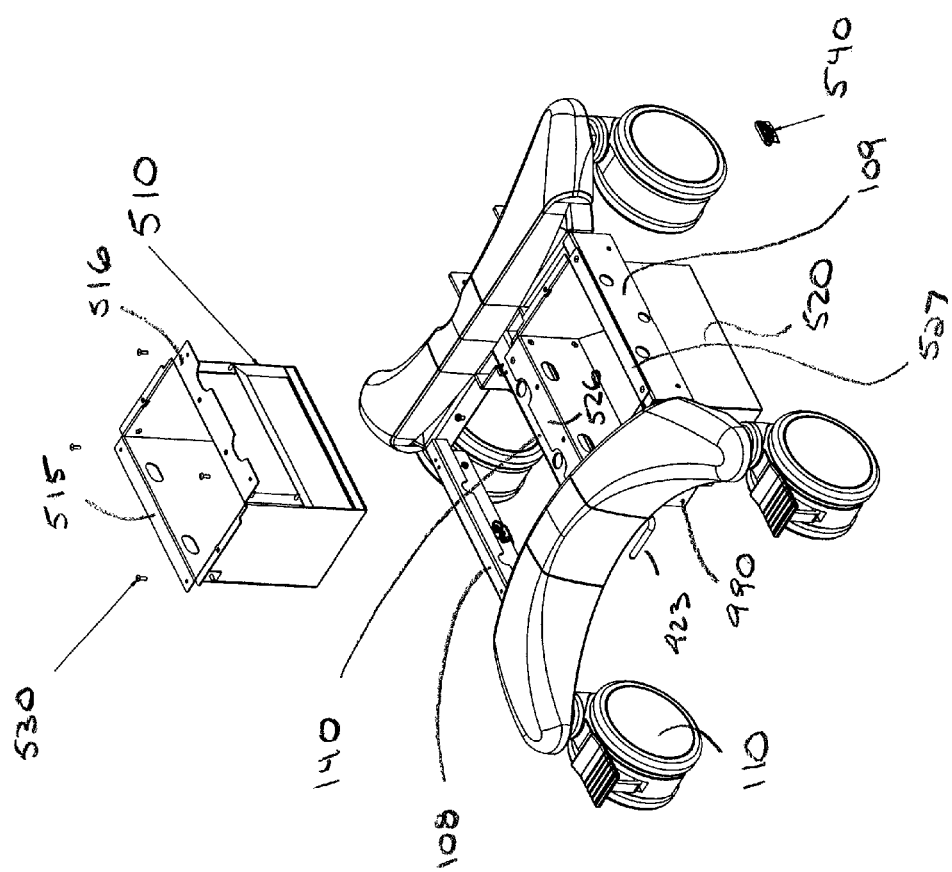
FIG. 5 is a perspective view of the rolling base section of FIG. 4, showing the addition of battery cell compartments.

As shown in FIG. 5, optional battery cell compartments 510 and 520 are generally cube-shaped with an open top and a closed bottom, and are adapted to house the battery cells that provide power to the electrical components housed on the mobile cart. Battery cell compartment 510 comprises left and right top flanges, 515 and 516 respectively. Left top flange 515 is adapted to rest on top of at least a portion of the top of left frame member 108, and right top flange 516 is adapted to rest on top of at least a portion of the top of the center frame member 140. Similarly, battery cell 520 comprises left and right top flanges 526 and 527, respectively. Left top flange 526 is adapted to rest on top of at least a portion of the top of the center frame member 140. Right top flange 527 is adapted to rest on top of at least a portion of the top of right frame member 109.

Figure 6:
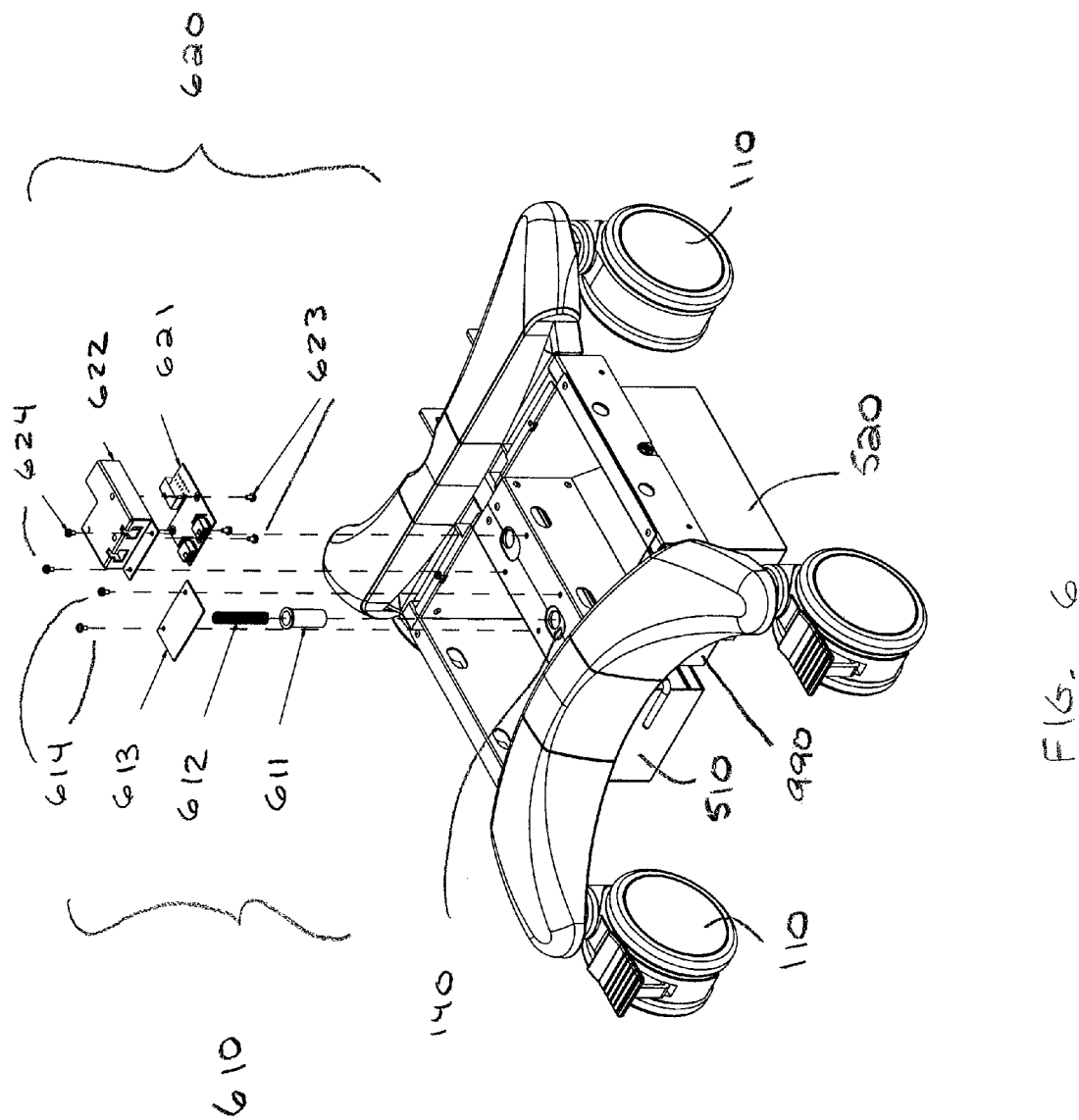
FIG. 6 is a perspective view of the rolling base section of FIG. 5, showing the addition of a spring assembly and an electrical interconnect assembly.

FIG. 6 shows the addition of spring assembly 610 and electrical interconnect assembly 620 to base frame 105. Spring assembly 610 is used to exert a slight downward pressure on the wheel assembly 940 of manually-engaged traction wheel 990, as described in detail below. Spring assembly 610 acts as a shock absorber, allowing wheel assembly 940 to give and still remain in contact with the floor. Electrical interconnect assembly 620 connects the battery cells 710 and 720, which are shown in FIG. 7 and described below.

In a preferred embodiment, spring assembly 610 comprises a bushing 611, a spring 612, a retainer 613 and one or more screws or fasteners 614 to couple retainer 613 to center frame member 140. Spring 612 is preferably a compression spring.

In a preferred embodiment, electrical interconnect assembly 620 comprises interconnect board 621, interconnect board housing 622, screws 623 to couple interconnect board 621 to interconnect board housing 622, and screws or fasteners 624 to couple interconnect board housing 622 to center frame member 140. In alternate embodiments, interconnect board 621 includes a connector (not shown) that is used to power an automatically-engaged traction wheel 1010, described in detail below.

Figure 7:
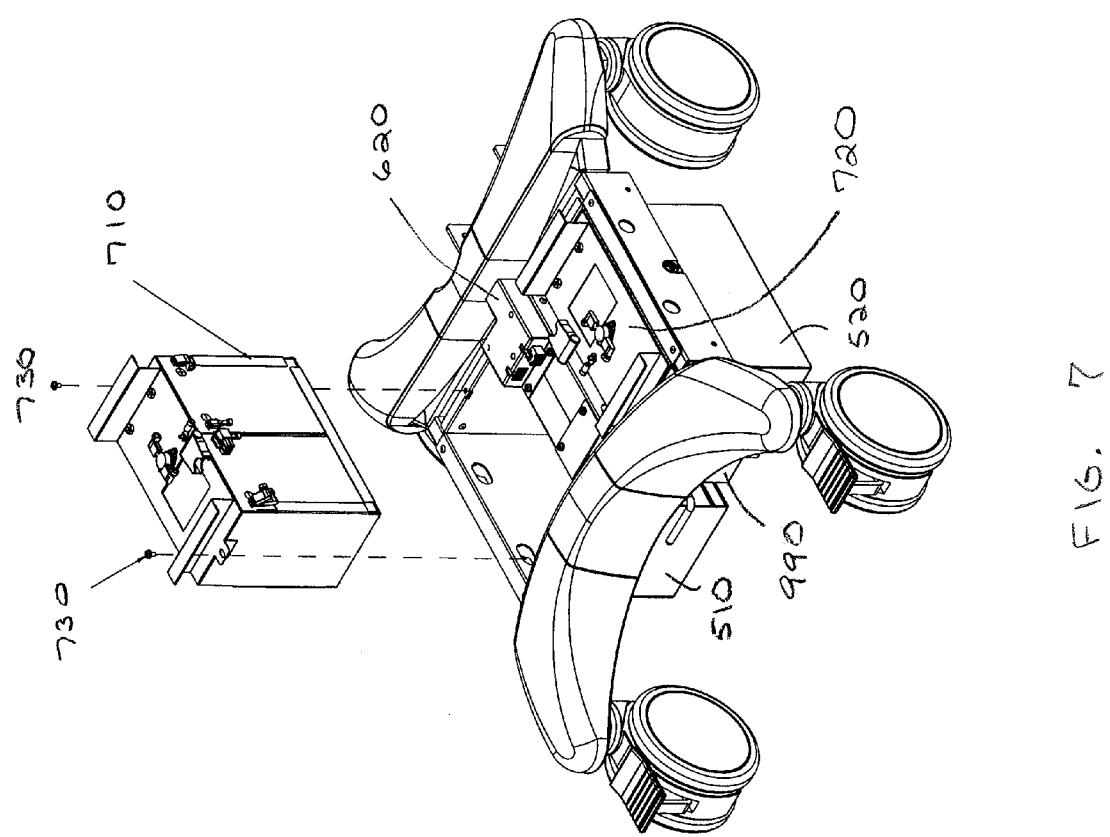
FIG. 7 is a perspective view of the rolling base section of FIG. 6, showing the addition of battery cells.

As shown in FIG. 7, optional battery cells 710 and 720 are housed in optional battery cell compartments 510 and 520, respectively, and coupled to base frame 105 with screws or fasteners 730.

FIG. 8A shows the addition of top cover member 810, which completes a preferred embodiment of the mobile cart base 800. Top cover member 810 is preferably made of plastic.

In an alternate embodiment, the base frame 105 may not include center frame member 140, battery cell compartments 510 and 520, and/or battery cells 710 and 720, and the manually-engaged traction wheel 990 may be mounted to either or both of the left and right frame members 108 and 109.

Figure 8B:
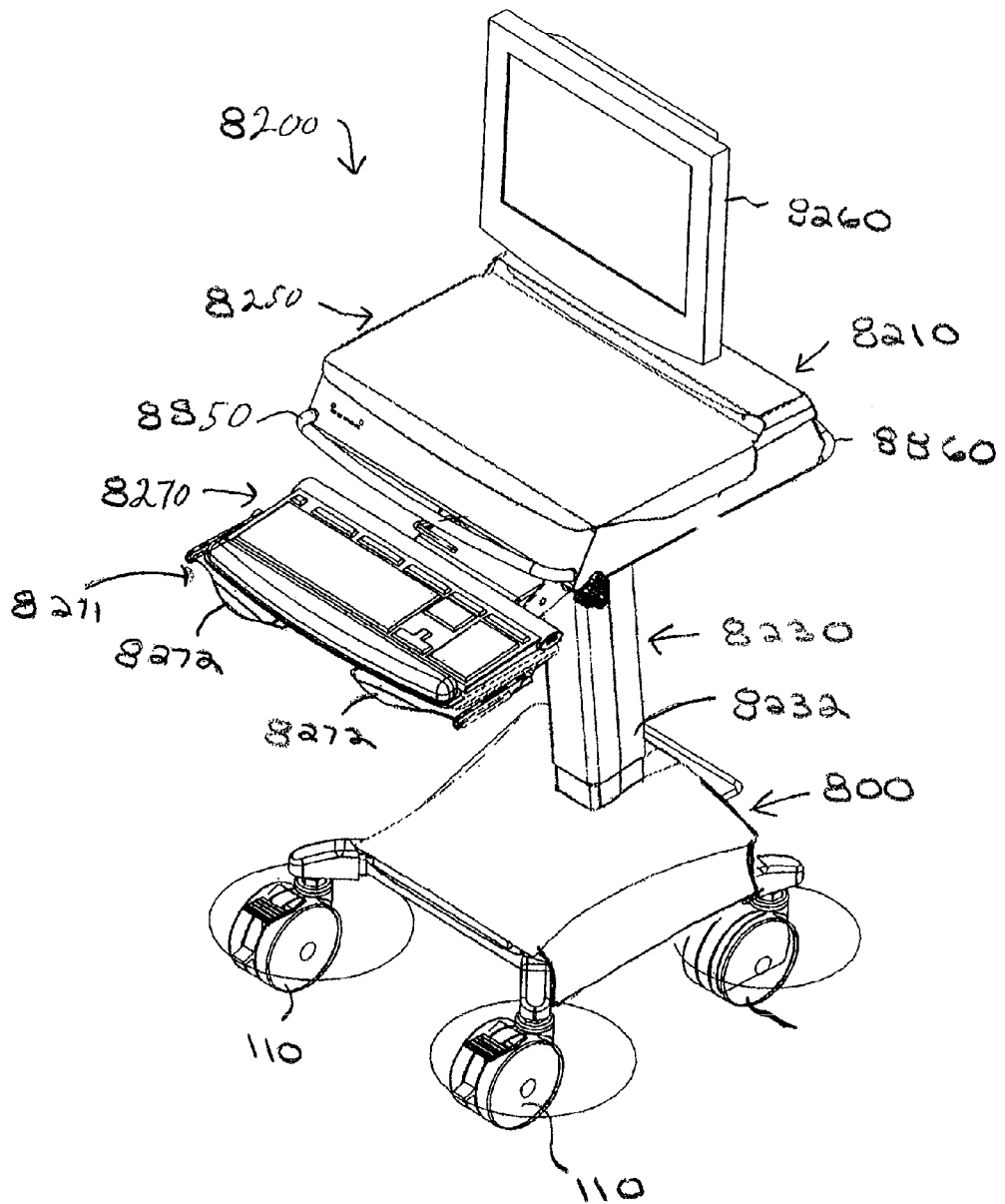
FIG. 8B is a perspective view of a mobile cart.

In one non-limiting embodiment, mobile cart base 800 may be used as the rolling base section for a mobile cart, such as mobile cart 8200 shown in FIG. 8B. Mobile cart 8200 may comprise a mobile cart base 800, upper working section 8210, and intermediate section 8230. Intermediate section 8230 may comprise a length-adjustable upwardly-extending post 8232, which allows the height of upper working section 8210 to be adjusted. Upper working section 8210 may include a keyboard support 8271 adapted to carry keyboard 8270, and one or two retractable mouse trays 8272. Mobile cart 8200 may also carry a computer (not shown), such as by a bracket coupled to upper working section 8210. Upper working section 8210 may also carry a computer monitor 8260 and a storage compartment 8250. Mobile cart 8200 may also include a front projecting handle 8850 and a rear projecting handle 8860 to allow a user to roll the mobile cart.

II. Manually-Engaged Traction Wheel

The details of manually-engaged traction wheel 990, shown previously in FIGS. 4 through 7 and 8A, are shown in FIGS. 9A through 9H. With reference to FIGS. 9E, 9F, and 9H, manually-engaged traction wheel 990 comprises traction wheel housing 910, cam and lever wheel-positioning assembly 920, and cover plate 930. As shown in FIG. 9G, wheel-positioning assembly 920 comprises a cam 922, block 925, and a lever 923, coupled together with connector or fastener 921.

As shown in FIGS. 9C and 9D, traction wheel housing 910 comprises wheel assembly 940 and generally rectangular left and right assembly plates 911 and 912, respectively. Left assembly plate 911 and right assembly plate 912 each have an upper vertical flange, 917 and 918, respectively, that are adapted to couple manually-engaged traction wheel 990 to center frame member 140, as shown in FIG. 4. Wheel assembly 940 is sandwiched between and coupled to left assembly plate 911 and right assembly plate 912 with bushings 913 and 914, washers 915, and screws 916, or other known types of connectors or fasteners.

With reference to FIGS. 9A and 9B, wheel assembly 940 comprises wheel 941, and left and right wheel brackets 942 and 943, respectively. Left and right wheel brackets 942 and 943 form a housing for wheel 941. Wheel 941 is sandwiched between and coupled to left wheel bracket 942 and right wheel bracket 943 with bushing 944 and screws or fasteners 945. Bushing 944 is centered through wheel 941, and allows wheel 941 to rotate.

Left wheel bracket 942 and right wheel bracket 943 each define an elongated slot, 946 and 947, respectively, through which bushing 913 is inserted and coupled to post 919, as shown in FIGS. 9B, 9C and 9D. This configuration allows wheel assembly 940 to move up and down relative to the left and right assembly plates, 911 and 912, of the traction wheel housing 910. The range of movement of wheel assembly 940 is guided and limited by elongated slots 946 and 947.

When assembled, wheel assembly 940 defines a top member 966 and a notch 950. As shown in FIG. 9F, notch 950 accommodates cam and lever assembly 920. When cam and lever assembly 920 is engaged, and as shown in FIG. 9F, cam 922 is in contact with top member 966. Conversely, when cam and lever assembly 920 is disengaged, cam 922 is not in contact with top member 966.

The wheel assembly 940 is lowered or raised by lever 923. When lever 923 is in a first position, for example a generally horizontal position, as shown in FIGS. 9E and 9F, cam and lever assembly 920 is engaged, and wheel assembly 940 is raised, such that wheel 941 is raised above and not in contact with the floor or other surface. When lever 923 is moved up or down ninety degrees to a second position, for example in the direction of arrow A or arrow B, cam and lever assembly 920 is disengaged, and wheel assembly 940 is lowered, such that wheel 941 is in contact with the floor or other surface.

III. Automatically-Engaged Traction Wheel

The details of automatically-engaged traction wheel 1010 are shown in FIGS. 10A through 10I. With reference to FIGS. 10H and 10G, automatically-engaged traction wheel 1010 comprises traction wheel housing 1030, motor and shaft wheel-positioning assembly 1040, and cover plate 1050, and is coupled together with screws 1060 or other forms of known connectors or fasteners.

As shown in FIG. 10I, traction wheel housing 1030 comprises wheel assembly 1020 and generally rectangular left and right assembly plates 1031 and 1032, respectively. Left assembly plate 1031 and right assembly plate 1032 each have an upper vertical flange, 1033 and 1034, respectively. Vertical flanges 1033 and 1034 are adapted to couple automatically-engaged traction wheel 1010 to center frame member 140 of base frame 105, similar to the manner in which manually-engaged traction wheel 990 is coupled to center frame member 140, as shown in FIG. 4. Wheel assembly 1020 is sandwiched between and coupled to left assembly plate 1031 and right assembly plate 1032 with bushings 1035 and 1036, washers 1037, and screws 1038, or other known types of connectors or fasteners.

With reference to FIGS. 10A and 10B, wheel assembly 1020 comprises wheel 1021, left and right wheel brackets 1022 and 1023, respectively, and motor engagement member 1024. Motor engagement member 1024 defines a notch 1028. Left and right wheel brackets 1022 and 1023 form a housing for wheel 1021. Wheel 1021 is sandwiched between and coupled to left wheel bracket 1022 and right wheel bracket 1023 with bushing 1025 and screws or fasteners 1026. Motor engagement member is coupled to right wheel bracket 1023 with screws 1029 and nuts 1027, or other known forms of connectors. Bushing 1025 is centered through wheel 1021, and allows wheel 1021 to rotate. When assembled, threaded shaft 1042 of motor and shaft assembly 1040, described below, extends through notch 1028.

Left wheel bracket 1022 and right wheel bracket 1023 each define an elongated slot, 1061 and 1062, respectively, through which bushing 1036 is inserted and coupled to 1039, as shown in FIG. 10I. This configuration allows wheel assembly 1020 to move up and down relative to the left and right assembly plates, 1031 and 1032, of the traction wheel housing 1030. The range of movement of wheel assembly 1020 is guided and limited by elongated slots 1061 and 1062.

Motor and shaft wheel-positioning assembly 1040 is shown in FIGS. 10C through 10F. With reference to FIG. 10E, motor and shaft assembly 1040 comprises motor 1041, threaded shaft 1042, motor electrical assembly 1070, bracket 1043, connector block 1044 and collar 1045, and is coupled together with screws or fasteners 1046 and 1047. Motor electrical assembly 1070, bracket 1043, connector block 1044 and collar 1045 ride up and down as the threaded shaft 1042 turns. With reference to FIG. 10F, motor electrical assembly 1070 comprises circuit board 1072 and housing 1071, which are coupled together with screws or fasteners 1073.

In a preferred embodiment, automatically-engaged traction wheel 1010 is motion sensitive. Circuit board 1072 includes a Hall Effect sensor 1082 that controls motor 1041. Hall Effect sensor 1082 responds to a small magnet 1083 embedded in wheel 1021, as shown in FIG. 10A. When the mobile cart base is in motion and wheel 1021 is spinning, the magnet 1083 is effectively sending an "on/off" signal to the Hall Effect sensor 1082.

When wheel 1021 is not spinning, the Hall Effect sensor 1082 does not detect the "on/off" signal from magnet 1083, and motor 1041 turns threaded shaft 1042 to a first position such that wheel assembly 1020 is raised relative to the traction wheel housing 1030 and wheel 1021 is no longer in contact with the floor or other surface. When wheel 1021 is spinning, the Hall Effect sensor 1082 detects the "on/off" signal from the magnet 1083, and motor 1041 turns threaded shaft 1042 to a second position such that wheel assembly 1020 is lowered relative to the traction wheel housing 1030 and wheel 1021 is in contact with the floor or other surface.

Circuit board 1072 also includes a vibration sensor chip 1081. When the mobile cart is in motion, the vibration sensor chip 1081 causes motor 1041 to turn threaded shaft 1042 so as to lower wheel assembly 1020, such that wheel 1021 is in contact with the floor or other surface.

In an alternate embodiment, automatically-engaged traction wheel 1010 is operated by an on/off switch or button, which may be located on the mobile cart base 800, or the upper working section 8210 or the intermediate section 8230 of the mobile cart 8200.

Motor 1041 receives power from the on-board battery cells 710 and 720 through interconnect board 621, shown in FIG. 6, through two terminals 1048 located on the outer side of motor 1041, shown in FIGS. 10D and 10E.

The claims should not be read as limited to the described order or elements unless stated to that effect. Therefore, all embodiments that come within the scope and spirit of the following claims and equivalents thereto are claimed as the invention.

What is claimed:

1. A base for a mobile cart, comprising:
a frame;
a plurality of wheel members mounted to the frame, each wheel member comprising a wheel, where at least two of the wheel members swivel relative to the frame, and at least one of the wheel members is fixed such that it does not swivel relative to the frame;
a traction wheel housing assembly coupled to the frame, the traction wheel housing assembly comprising:
a non-swiveling wheel assembly comprising the non-swiveling wheel, a first wheel bracket, and a second wheel bracket, the non-swiveling wheel member rotatably coupled between the first wheel bracket and the second wheel bracket at an axis of rotation, each of the first wheel bracket and the second wheel bracket defining a corresponding first engagement slot and a second engagement slot; and
a traction wheel housing, comprising:
a first assembly plate and a second assembly plate, the non-swiveling wheel assembly pivotably coupled between the first assembly plate and the second assembly plate at a first end of the traction wheel housing, and
a bushing coupled between the first assembly plate and the second assembly plate at a second end of the traction wheel housing, the second end opposing the first end, the bushing at least partially disposed within the first engagement slot and the second engagement slot defined by the corresponding first wheel bracket and second wheel bracket, the first engagement slot and the second engagement slot configured to guide the bushing and limit the motion of the non-swiveling wheel assembly as the non-swiveling wheel assembly pivots between a first position and a second position relative to the traction wheel housing;
where the traction wheel housing comprises a wheel-positioning assembly coupled to the non-swiveling wheel assembly; and
where the wheel-positioning assembly is adapted to move the non-swiveling wheel assembly between the first position and the second position relative to the traction wheel housing and relative to the frame.

2. The base of claim 1, where the wheel-positioning assembly comprises a lever;
such that the lever is adapted to raise the non-swiveling wheel assembly when the lever is in a first position, to move the non-swiveling wheel assembly up relative to the frame, and the lever is further adapted to lower the non-swiveling wheel assembly when the lever is in a second position, to move the non-swiveling wheel assembly down relative to the frame.

3. The base of claim 2, where the wheel-positioning assembly further comprises a cam;
such that the cam is adapted to engage the non-swiveling wheel assembly when the lever is in the first position, and the cam is further adapted to disengage the non-swiveling wheel assembly when the lever is in the second position.

4. The base of claim 1, where the frame has a generally rectangular shape, and the non-swiveling wheel member is mounted to the approximate center of the frame.

5. The base of claim 1, where the frame has a generally rectangular shape, and the non-swiveling wheel member is mounted to one side of the frame.

6. A base for a mobile cart, comprising:
a generally rectangular frame;
a plurality of wheel members mounted to the frame, each wheel member comprising a wheel, where at least two of the wheel members swivel relative to the frame, and at least one of the wheel members is fixed such that it does not swivel relative to the frame;
a traction wheel housing assembly coupled to the generally rectangular frame, the traction wheel housing assembly comprising:
a non-swiveling wheel assembly comprising the non-swiveling wheel, a first wheel bracket, and a second wheel bracket, the non-swiveling wheel member rotatably coupled between the first wheel bracket and the second wheel bracket at an axis of rotation, each of the first wheel bracket and the second wheel bracket defining a corresponding first engagement slot and a second engagement slot; and
a traction wheel housing, comprising:
a first assembly plate and a second assembly plate, the non-swiveling wheel assembly pivotably coupled between the first assembly plate and the second assembly plate at a first end of the traction wheel housing, and
a bushing coupled between the first assembly plate and the second assembly plate at a second end of the traction wheel housing, the second end opposing the first end, the bushing at least partially disposed within the first engagement slot and the second engagement slot defined by the corresponding first wheel bracket and second wheel bracket, the first engagement slot and the second engagement slot configured to guide the bushing and limit the motion of the non-swiveling wheel assembly as the non-swiveling wheel assembly pivots between a first position and a second position relative to the traction wheel housing;
where the traction wheel housing comprises a lever, such the lever being adapted to raise the non-swiveling wheel assembly when the lever is in a first position, to move the non-swiveling wheel assembly up relative to the frame, and the lever being further adapted to lower the non-swiveling wheel assembly when the lever is in a second position, to move the non-swiveling wheel assembly down relative to the frame.

7. The base of claim 6, where the traction wheel housing further comprises a cam,
such that the cam is adapted to engage the non-swiveling wheel assembly when the lever is in the first position, and the cam is further adapted to disengage the non-swiveling wheel assembly when the lever is in the second position.

8. The base of claim 7, where the frame comprises a front frame member, a rear frame member, two opposing side members and a center frame member coupled to the front frame member and to the rear frame member;
where one swiveling wheel member is mounted to the frame proximate each of the four corners of the frame; and
where the non-swiveling wheel member is mounted to the center frame member proximate the center of the frame.

9. The base of claim 6,
where the frame comprises a front frame member, a rear frame member, two opposing side members and a center frame member coupled to the front frame member and to the rear frame member;
where one swiveling wheel member is mounted to the frame proximate each of the four corners of the frame; and
the non-swiveling wheel member is mounted to one of the opposing side members.

10. A base for a mobile cart, comprising:
a frame;
a set of swiveling wheel assemblies coupled to the frame, each swiveling wheel assembly of the set of swiveling wheel assemblies configured to swivel about a vertical axis associated with the frame;
a traction wheel housing assembly coupled to the frame, the traction wheel housing assembly comprising:
a non-swiveling wheel assembly comprising the non-swiveling wheel, a first wheel bracket, and a second wheel bracket, the non-swiveling wheel member rotatably coupled between the first wheel bracket and the second wheel bracket at an axis of rotation, each of the first wheel bracket and the second wheel bracket defining a corresponding first engagement slot and a second engagement slot, the non-swiveling wheel assembly disposed proximate to a center of a side member of the frame; and
a traction wheel housing, comprising:
a first assembly plate and a second assembly plate, the non-swiveling wheel assembly pivotably coupled between the first assembly plate and the second assembly plate at a first end of the traction wheel housing, and
a bushing coupled between the first assembly plate and the second assembly plate at a second end of the traction wheel housing, the second end opposing the first end, the bushing at least partially disposed within the first engagement slot and the second engagement slot defined by the corresponding first wheel bracket and second wheel bracket, the first engagement slot and the second engagement slot configured to guide the bushing and limit the motion of the non-swiveling wheel assembly as the non-swiveling wheel assembly pivots between a first position and a second position relative to the traction wheel housing.

11. The base of claim 10, wherein the non-swiveling wheel assembly is further disposed proximate to a center of a front member of the frame and a back member of the frame.

12. The base of claim 10, further comprising a spring assembly disposed between the non-swiveling wheel assembly and the frame, the spring assembly configured to exert a pressure between the non-swiveling wheel assembly and the frame to maintain a wheel of the non-swiveling wheel assembly substantially in contact with a support surface.

13. The base of claim 10, wherein the non-swiveling wheel assembly comprises a wheel-positioning assembly coupled to the non-swiveling wheel assembly, the wheel-positioning assembly configured to move the non-swiveling wheel assembly between a first position and a second position relative to the frame.

14. The base of claim 3, wherein the cam is disposed between the non-swiveling wheel assembly and a cover plate of the traction wheel housing, the cover plate configured to rotationally support the lever.

* * * * *